United States Patent
Mentzer et al.

(10) Patent No.: US 7,304,674 B2
(45) Date of Patent: Dec. 4, 2007

(54) SAMPLING IMAGE SIGNALS GENERATED BY PIXEL CIRCUITS OF AN ACTIVE PIXEL SENSOR (APS) IMAGE SENSOR IN A SUB-SAMPLING MODE

(75) Inventors: Ray A. Mentzer, Corvallis, OR (US); Matthew M. Borg, Albany, OR (US)

(73) Assignee: Avago Technologies General IP Pte Ltd, Singapore (SG)

( * ) Notice: Subject to any disclaimer, the term of this patent is extended or adjusted under 35 U.S.C. 154(b) by 724 days.

(21) Appl. No.: 10/295,597

(22) Filed: Nov. 15, 2002

(65) Prior Publication Data

US 2004/0095494 A1    May 20, 2004

(51) Int. Cl.
*H04N 3/14* (2006.01)
(52) U.S. Cl. .............. 348/300; 348/241; 348/302; 250/208.1
(58) Field of Classification Search ......... 348/230.1, 348/241, 294, 300–308, 320, 322; 250/208.1
See application file for complete search history.

(56) References Cited

U.S. PATENT DOCUMENTS

| | | | |
|---|---|---|---|
| 5,793,423 A * | 8/1998 | Hamasaki | 348/302 |
| 5,949,483 A * | 9/1999 | Fossum et al. | 348/303 |
| 6,239,839 B1 * | 5/2001 | Matsunaga et al. | 348/308 |
| 6,365,886 B1 * | 4/2002 | Ang et al. | 250/208.1 |
| 6,452,153 B1 * | 9/2002 | Lauxtermann et al. | 250/208.1 |
| 6,531,690 B2 * | 3/2003 | Kozuka | 250/208.1 |
| 6,747,264 B2 * | 6/2004 | Miida | 250/214 AG |
| 7,242,427 B2 * | 7/2007 | Kokubun et al. | 348/241 |
| 2001/0013901 A1 * | 8/2001 | Matsunaga et al. | 348/308 |
| 2002/0154233 A1 * | 10/2002 | Yoshimura et al. | 348/308 |
| 2002/0154347 A1 * | 10/2002 | Funakoshi et al. | 358/513 |

OTHER PUBLICATIONS

Digest of Technical Papers, article regarding International Solid-State Circuits Conference entitled "A 1/1.8" 3M Pixel FT-CCD with On-Chip Horizontal Sub-Sampling for DSC Applications; Feb. 4, 2002; pp. 34-35.
Agilent Product Overview entitled "Agilent CMOS Image Sensors ADCS-1021 (CIF), ADCS-2021 (VGA)"; Apr. 10, 2002; 2 pgs.
Agilent Data Sheet entitled "Agilent ADCS-1021, ADCS-2021 CMOS Image Sensors", Jul. 24, 2002; 8 pgs.
Office Action for German Patent Application No. 10338700.5-42 dated Nov. 20, 2006.
English Translation of German Office Action for German Patent Application No. 10338700.5-42 dated Nov. 20, 2006.

* cited by examiner

*Primary Examiner*—Lin Ye
*Assistant Examiner*—Chriss S Yoder, III

(57) ABSTRACT

A method of sampling image signals generated by pixel circuits of an active pixel sensor (APS) image sensor. The APS image sensor supports a normal mode of operation and a sub-sampling mode of operation. The method includes providing a plurality of column amplifiers. A row of pixels circuits to sample is selected. Image signals from each pixel circuit in the selected row are routed to a different one of the plurality of column amplifiers when the APS image sensor is in the normal mode of operation. Image signals from a plurality of the pixel circuits in the selected row are routed to one of the plurality of column amplifiers when the APS image sensor is in the sub-sampling mode of operation.

20 Claims, 8 Drawing Sheets

SAMPLING IMAGE SIGNALS GENERATED BY PIXEL CIRCUITS OF AN ACTIVE PIXEL SENSOR (APS) IMAGE SENSOR IN A SUB-SAMPLING MODE

THE FIELD OF THE INVENTION

The present invention generally relates to active pixel sensor (APS) image sensors, and more particularly to the sampling of image signals generated by pixel circuits of an APS image sensor in a sub-sampling mode.

BACKGROUND OF THE INVENTION

One type of prior art image sensor is a charge-coupled device (CCD) image sensor. CCD image sensors typically include a very closely packed array of polysilicon electrodes that are formed on the surface of the CCD imaging chip. Conceptually, a CCD is a two-dimensional array of Metal Oxide Semiconductor (MOS) capacitors that collect and transfer photon-generated charge. CCD image sensors typically include multiple shift registers to transfer charge from the CCD array to amplifiers.

Another type of prior art image sensor is an active pixel sensor (APS) image sensor. APS image sensors are typically fabricated using Complimentary Metal Oxide Silicon (CMOS) processing technology, and are also typically referred to as CMOS image sensors. APS image sensors sense light by converting incident light (photons) into electronic charge (electrons) by a photo-conversion process. Color APS image sensors are typically made by coating each individual pixel with a filter color (e.g. red, green, and blue). APS image sensors typically include a photo sensor (e.g., photo diode) and several CMOS transistors for each pixel. Some APS image sensors provide integrated analog-to-digital conversion and full timing control on a single integrated circuit.

Some APS image sensors support sub-sampling modes of operation. In sub-sampling modes, the amount of data that is imaged is reduced, while the field of view is maintained. For example, in a two-to-one sub-sampling mode (e.g., sample two pixels, skip two pixels, sample two pixels, etc.), the amount of image data that is processed is reduced by a factor of four when sub-sampling in both the horizontal and vertical directions. In a four-to-one sub-sampling mode (e.g., sample two pixels, skip six pixels, sample two pixels, etc.), the amount of image data that is processed is reduced by a factor of sixteen when sub-sampling in both the horizontal and vertical directions. In general, enabling sub-sampling increases the frame rate. Unfortunately, a drawback of conventional sub-sampling methods is that significant image content is lost by not sampling the skipped pixels. The missing information can result in undesirable abrupt transitions at the boundary between sampled and skipped pixels in the captured image.

SUMMARY OF THE INVENTION

One form of the present invention provides a method of sampling image signals generated by pixel circuits of an active pixel sensor (APS) image sensor. The APS image sensor supports a normal mode of operation and a sub-sampling mode of operation. The method includes providing a plurality of column amplifiers. A row of pixels circuits to sample is selected. Image signals from each pixel circuit in the selected row are routed to a different one of the plurality of column amplifiers when the APS image sensor is in the normal mode of operation. Image signals from a plurality of the pixel circuits in the selected row are routed to one of the plurality of column amplifiers when the APS image sensor is in the sub-sampling mode of operation.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
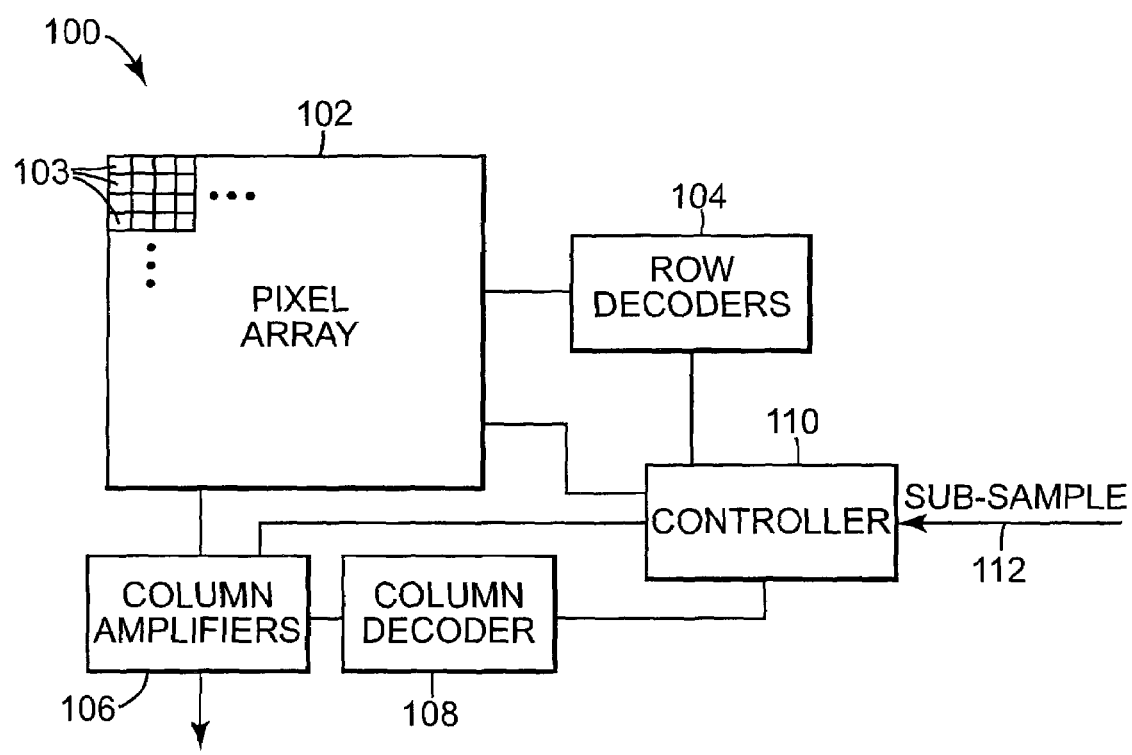
FIG. 1 is a block diagram illustrating major components of an APS image sensor according to one embodiment of the present invention.

FIG. 1 is a block diagram illustrating major components of an active pixel sensor (APS) image sensor 100 according to one embodiment of the present invention. Sensor 100 includes pixel array 102, row decoders 104, column amplifiers 106, column decoder 108, and controller 110. Pixel array 102 includes a plurality of pixel circuits (pixels) 103, with each pixel circuit 103 providing one pixel of image information. The pixel circuits 103 in pixel array 102 are organized into a plurality of rows and a plurality of columns (e.g., 480×640). In one form of the invention, each pixel circuit 103 includes three Metal-Oxide-Semiconductor Field Effect Transistors (MOSFETs) and a photodiode (not shown) configured in a conventional manner known to those of ordinary skill in the art.

Controller 110 is coupled to pixel array 102, row decoders 104, column amplifiers 106, and column decoder 108. Controller 110 generates control signals for controlling the operation of sensor 100, including signals to initiate, maintain, and stop image capture processes. In one embodiment, sensor 100 supports various user-selectable sub-sampling modes of operation, which are selectable via sub-sampling mode input 112.

The rows of pixels 103 in array 102 alternate between even rows and odd rows. In one embodiment, the first row of pixels 103 in array 102 is designated as an even row. Similarly, the columns of pixels 103 in array 102 alternate between even columns and odd columns. In one embodiment, the first column of pixels 103 in array 102 is designated as an even column. In one form of the invention, pixel array 102 is configured in a Red-Green-Blue (RGB) Bayer color filter pattern. In one form of this configuration, even rows of pixels 103 alternate between blue pixels and green pixels, with the first pixel in each even row being a blue pixel, and odd rows of pixels 103 alternate between green pixels and red pixels, with the first pixel in each odd row being a green pixel.

In one embodiment, column amplifiers 106 include one column amplifier for each column of pixels 103 in array 102. The column amplifiers 106 connected to an even column of pixels 103 are referred to as even column amplifiers, and the column amplifiers 106 connected to an odd column of pixels 103 are referred to as odd column amplifiers. In one embodiment, the column amplifier 106 connected to the first column of pixels 103 is identified by the letter "n," and subsequent column amplifiers 106 are identified by integer increments to "n" (e.g., n+1, n+2, n+3, etc.). In one form of the invention, the column amplifiers 106 identified by n, n+2, n+4, etc., are even column amplifiers, and the column amplifiers 106 identified by n+1, n+3, n+5, etc., are odd column amplifiers 106. In one embodiment, the first column in array 102 is identified as column 0 (i.e., n=0).

In one form of the invention, pixel information from pixel array 102 is sampled in rows. The sampling time for each row of pixels is referred to as a row sample interval. A row of pixels 103 in pixel array 102 is selected by row decoders 104.

The sampling of pixel information according to one embodiment is divided into three phases: (1) an integration phase; (2) a sample reset phase; and (3) an integration reset phase. During the integration phase, pixel circuits 103 integrate the amount of light directed onto their photodiodes, and output integrated voltages, Vs. Column amplifiers 106 act as an analog buffer that samples and holds the outputs of a selected row of pixels 103. At the end of the integration phase, column amplifiers 106 sample the integrated signal levels, Vs, from a selected row of pixels 103. The second phase of pixel sampling is the sample reset phase, where a selected row of pixels 103 is reset. At the end of the sample reset phase, column amplifiers 106 sample the reset level, Vr, output by the selected row of pixels 103.

In one embodiment, the image signal generated by each pixel circuit 103 is the difference between the sampled reset voltage level, Vr, and the sampled integration voltage level, Vs, obtained after the integration period. At the end of a row sample interval, the difference between the reset signal levels, Vr, and integrated signal levels, Vs, is held on the outputs of column amplifiers 106, referenced to a common mode reference level. During a column processing interval, column amplifiers 106 are sequentially selected by column decoder 108 to output the corresponding held level. One embodiment of sensor 100 also includes gain amplifiers and analog-to-digital converters (not shown), to amplify and digitize signals output by column amplifiers 106.

During the integration reset phase, each pixel circuit 103 is reset to ensure that the pixel circuits 103 start from a common voltage independent of the integration level of a previously captured frame.

Figure 2A:
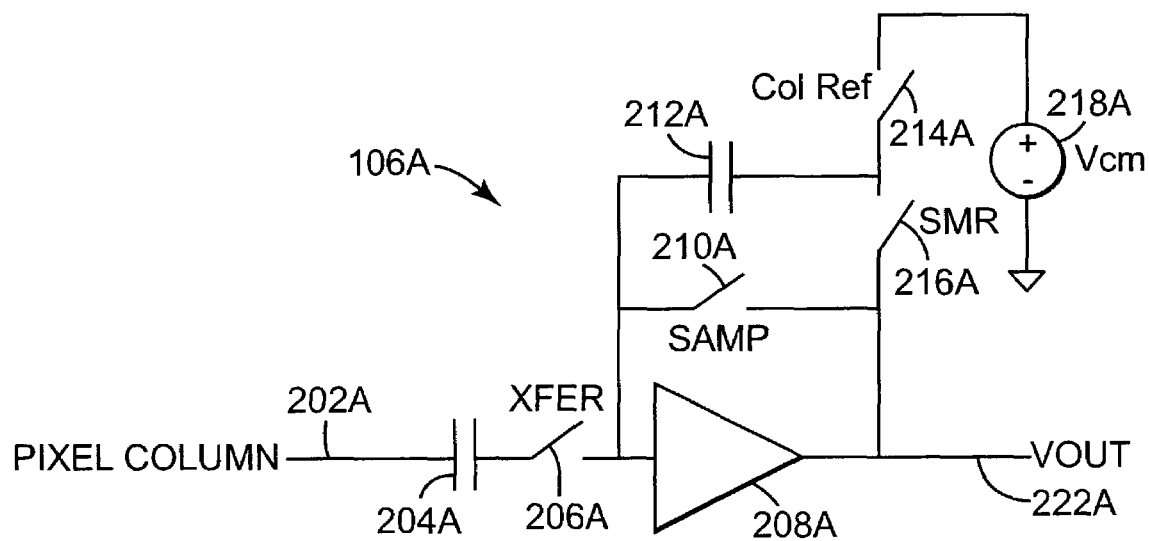
FIG. 2A is an electrical schematic diagram illustrating a column amplifier suitable for use in one embodiment of the present invention.

FIG. 2A is an electrical schematic diagram illustrating a column amplifier 106A suitable for use in one embodiment of the present invention. Column amplifiers are identified generally herein with the reference number "106," and specific instances of column amplifiers 106 are identified with the reference number "106" and an appended letter.

Column amplifier 106A includes pixel column input node 202A, capacitors 204A and 212A, switches 206A, 210A, 214A, and 216A, amplifier 208A, common-mode voltage supply (Vcm) 218A, and output node (VOUT) 222A. Pixel column input node 202A is configured to be coupled to the output of a selected one of the pixel circuits 103 in one of the columns of array 102. Switches 206A, 210A, 214A, and 216A, are controlled by XFER, SAMP, colRef, and SMR control signals, respectively, which are generated by controller 110 (shown in FIG. 1) and output to column amplifier 106A. The operation of column amplifier 106A is described in further detail below with reference to FIG. 2B.

Figure 2B:
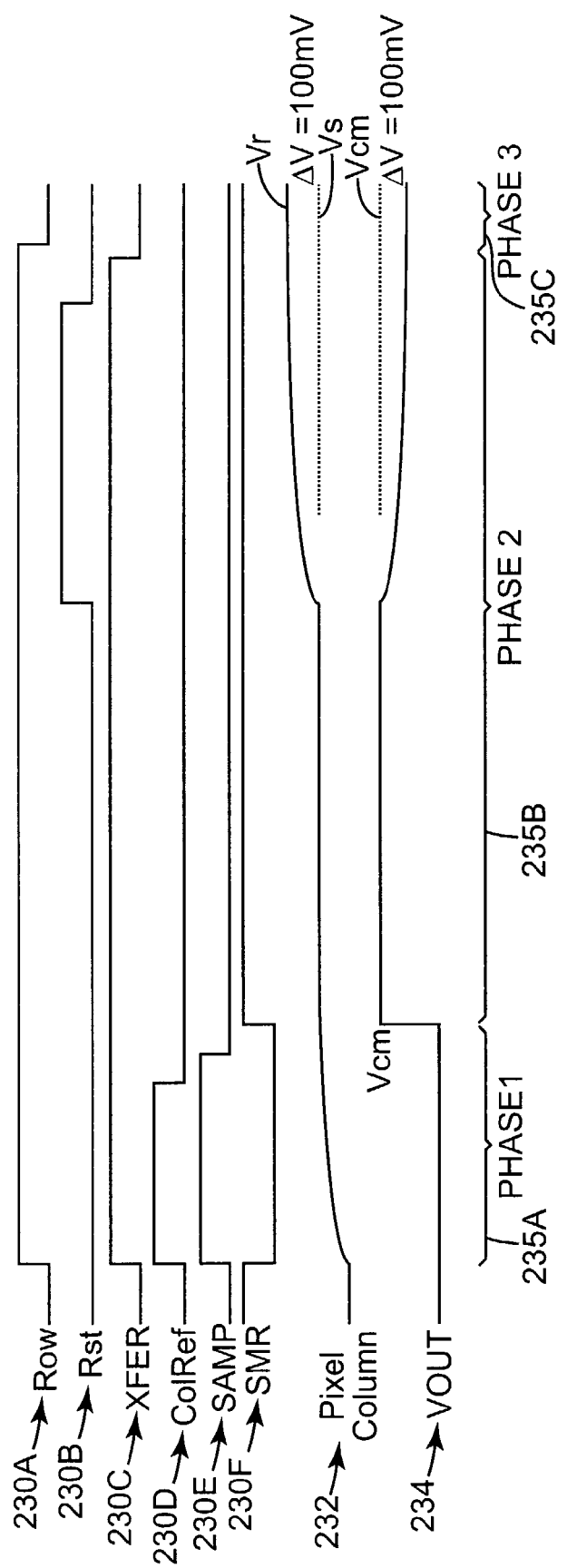
FIG. 2B is a timing diagram illustrating the timing of control signals for controlling the operation of the pixel circuits shown in FIG. 1 and the column amplifier shown in FIG. 2A according to one embodiment of the present invention.

FIG. 2B is a timing diagram illustrating the timing of control signals 230A-230F (collectively referred to as control signals 230) for controlling the operation of the pixel circuits 103 and the column amplifier 106A according to one embodiment of the present invention. Row signal 230A and Reset (Rst) signal 230B are signals that are sent from controller 110 through the row decoders 104 to pixel circuits 103 to select a row of pixels 103, and reset a row of pixels 103, respectively. XFER signal 230C, colRef signal 230D, SAMP signal 230E, and SMR signal 230F, are signals that are sent from controller 110 to column amplifier 106A to control the operation of switches 206A, 214A, 210A, and 216A, respectively. A logic high level for any of signals 230C-230F indicates that the corresponding switch is closed, and a logic low level for any of signals 230C-230F indicates that the corresponding switch is open.

FIG. 2B also illustrates example input and output waveforms of column amplifier 106A. Pixel column waveform 232 represents an example voltage level over time at the pixel column input node 202A of column amplifier 106A. VOUT waveform 234 represents the voltage level over time at the output node (VOUT) 222A of column amplifier 106A.

In one form of the invention, there are essentially three phases 235A-235C for each row sample interval. During the first phase 235A, an initial input, Vs, is sampled by column amplifier 106A. As mentioned above, Vs represents an integrated voltage level that is output from a pixel circuit 103. During the second phase 235B, the initial input, Vs, is subtracted from a final input, Vr. As mentioned above, Vr represents a reset voltage level that is output from a pixel circuit 103. During the third phase 235C, the difference between Vr and Vs is held at the output of the column amplifier 106A. Each of these phases 235A-235C will now be described in more detail.

During the first phase 235A, switch 206A is closed (XFER 230C goes high), thereby connecting (via capacitor 204A) the input node of the amplifier 208A to the pixel output of a pixel circuit 103 in a selected row in array 102. Switch 210A is closed (SAMP 230E goes high) during the first phase 235A, which places the amplifier 208A in a unity gain configuration. Switch 214A is closed (colRef 230D goes high) during the first phase 235A, thereby connecting one side of capacitor 212A to voltage supply 218A. During the first phase 235A, the input side of capacitor 204A is charged to the settled integrated output voltage, Vs, and capacitor 212A is charged with the difference between Vcm and the amplifier 208A unity gain voltage. At the end of the first phase 235A, switches 210A and 214A both open (SAMP 230E and colRef 230D go low), preventing any further change in the charge on the shared node between capacitors 204A and 212A, and effectively capturing Vs on capacitor 204A.

At the beginning of the second phase 235B, switch 216A is closed (SMR 230F goes high), putting capacitor 212A in the feedback loop and forcing a voltage equal to Vcm (minus a small error term due to the non-infinite gain of the inverting amplifier 208A) onto the column amplifier output 222A. During the second phase 235B, the selected pixel row is reset (by asserting Rst signal 230B), and the voltage at the column amplifier input 202A settles to the pixel reset level, Vr, as shown by waveform 232 in FIG. 2B.

At the beginning of the third phase 235C, switch 206A is opened (XFER 230C goes low) and the pixel reset voltage, Vr, is captured at the column amplifier input 202A. And the voltage at the column amplifier output 222A holds at a level represented by the following Equation I:

$$VOUT = Vcm - (C0/C1)(Vr - Vs + Vnoise) \qquad \text{Equation I}$$

where:
VOUT is the output voltage 234 on output node 222A;
Vcm is the reference voltage supplied by voltage supply 218A;
C0 is the capacitance of capacitor 204A;
C1 is the capacitance of capacitor 212A;
Vr is the pixel reset voltage;
Vs is the pixel output voltage after exposure; and
Vnoise is approximately equal to $(kt/c)^{1/2}$; where
k=Boltzman's constant,
t=temperature in degrees Kelvin, and
c=photodiode capacitance for the pixel circuit 103 connected to input 202A. (The noise contribution of the column amplifier itself to VOUT has been neglected as it is typically small compared to the noise contribution from the pixel circuit 103.)

As shown in FIG. 2B for waveform 232, the difference between Vr and Vs at the input 202A of the column amplifier 106A is represented by the symbol ΔV, which is 100 millivolts (mV) for the example waveform shown. For waveform 234, the difference (ΔV) between Vcm and the final output voltage (represented by Equation I above) is also equal to 100 mV. The signal to noise ratio (SNR) is given by the following Equation II:

$$SNR = (Vr - Vs)/Vnoise \qquad \text{Equation II}$$

Figure 3A:
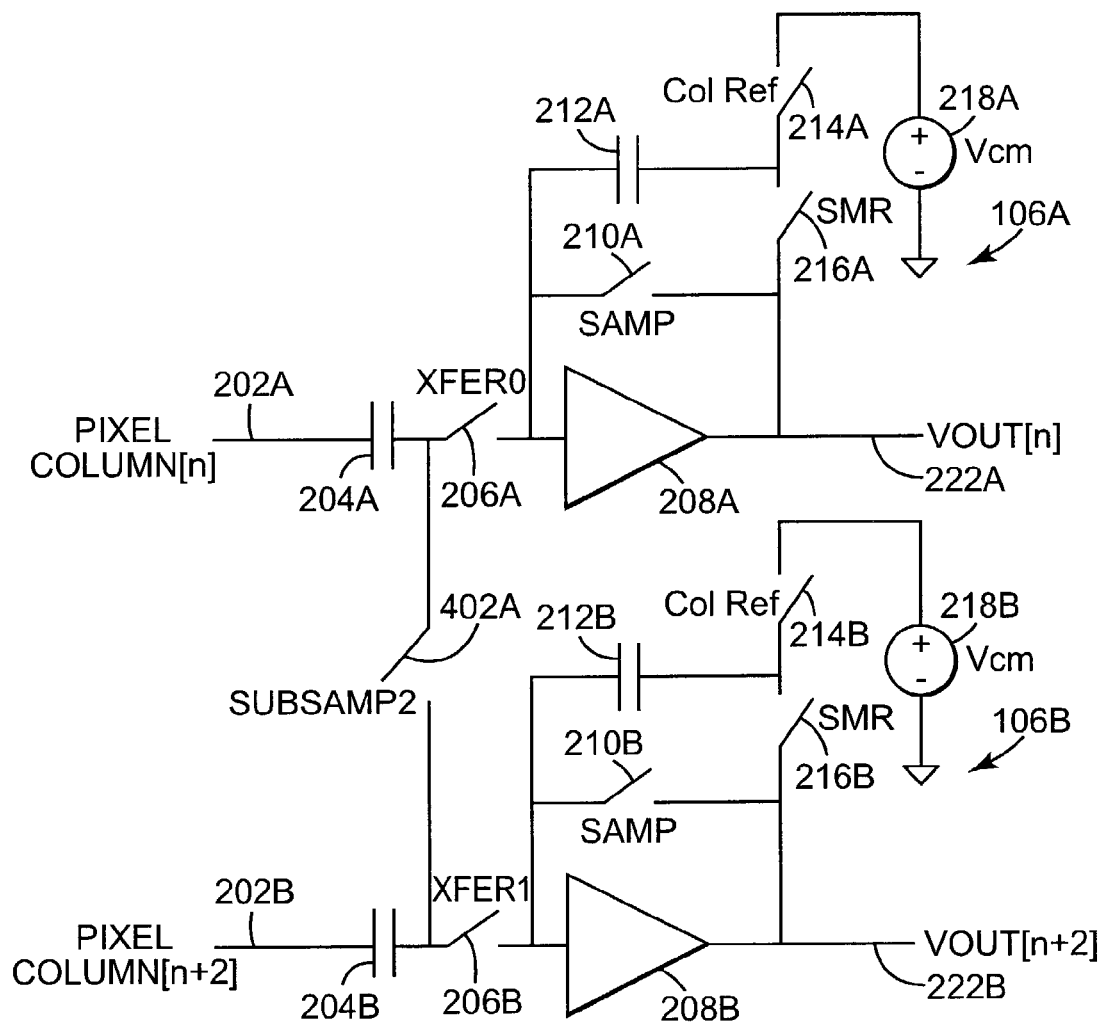
FIG. 3A is an electrical schematic diagram illustrating two even column amplifiers configured to provide increased sensitivity in a two-to-one sub-sampling mode according to one embodiment of the present invention.

FIG. 3A is an electrical schematic diagram illustrating two even column amplifiers 106A and 106B configured to provide increased sensitivity in a two-to-one sub-sampling mode according to one embodiment of the present invention. Column amplifier 106B is configured in the same general manner as column amplifier 106A, which was described above with reference to FIGS. 2A and 2B. Common elements between column amplifier 106A and column amplifier 106B are identified with the same reference numbers, but the letters "A" and "B" have been appended to the reference numbers to distinguish between the elements of the two column amplifiers 106A and 106B.

Column amplifiers 106A and 106B are coupled together via switch 402A. Switch 402A is connected between the node connecting capacitor 204A and switch 206A and the node connecting capacitor 204B and switch 206B. The operation of column amplifiers 106A and 106B is described in further detail below with reference to FIG. 3B.

Figure 3B:
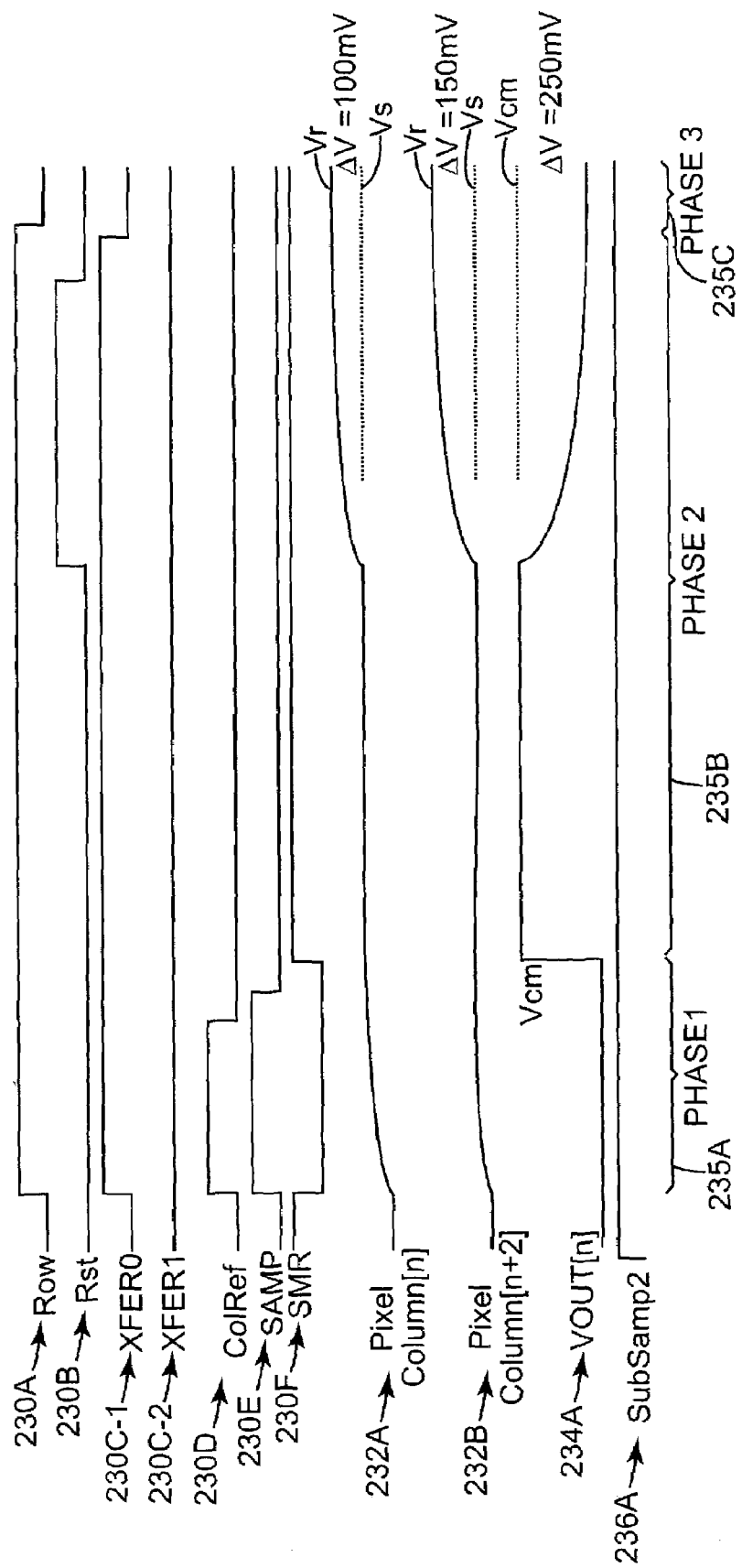
FIG. 3B is a timing diagram illustrating the timing of control signals for controlling the operation of the pixel circuits shown in FIG. 1 and the column amplifiers shown in FIG. 3A according to one embodiment of the present invention.

FIG. 3B is a timing diagram illustrating the timing of control signals 230A-230F (collectively referred to as control signals 230) for controlling the operation of the pixel circuits 103 and the column amplifiers 106A and 106B according to one embodiment of the present invention. As mentioned above, row signal 230A and Reset (Rst) signal 230B are signals that are sent from controller 110 through the row decoders 104 to pixel circuits 103 to select a row of pixels 103, and reset a row of pixels 103, respectively. XFER0 signal 230C-1 and XFER1 signal 230C-2 (collectively identified by reference number 230C) are signals that are sent from controller 110 to column amplifiers 106A and 106B to independently control the operation of switches 206A and 206B, respectively. ColRef signal 230D, SAMP signal 230E, and SMR signal 230F, are signals that are sent from controller 110 to column amplifiers 106A and 106B to control the operation of switches 214A-214B, 210A-210B, and 216A-216B, respectively. A logic high level for any of signals 230C-230F indicates that the corresponding switch is closed, and a logic low level for any of signals 230C-230F indicates that the corresponding switch is open.

FIG. 3B also illustrates example input and output waveforms of column amplifiers 106A and 106B. Pixel column [n] waveform 232A represents an example voltage level over time at the pixel column input node 202A of column amplifier 106A. Pixel column[n+2] waveform 232B represents an example voltage level over time at the pixel column input node 202B of column amplifier 106B. VOUT[n] waveform 234A represents the voltage level over time at the output node (VOUT[n]) 222A of column amplifier 106A.

Also shown in FIG. 3B is a sub-sample control signal (SubSamp2) 236A, which is output from controller 110 to control the operation of switch 402A. A logic high level for signal 236A indicates that the corresponding switch 402A is closed, and a logic low level for signal 236A indicates that the corresponding switch 402A is open. In one embodiment, controller 110 sets the SubSamp2 signal 236A high if a user has selected a two-to-one sub-sampling mode via sub-sample input 112 (shown in FIG. 1). As shown in FIG. 3B, SubSamp2 signal 236A is maintained at a logic high level for all three phases 235A-235C, so switch 402A is closed during this entire period. If sub-sampling is not enabled, switch 402A remains open and column amplifiers 106A and 106B operate independently, as described above with reference to FIGS. 2A and 2B.

As indicated in FIG. 3B, during the first phase 235A, switch 206A is closed (XFER0 230C-1 goes high), thereby connecting (via capacitor 204A) the input node of the amplifier 208A to the pixel output of a first pixel circuit 103 in a selected row in array 102 (i.e., the pixel circuit 103 connected to input 202A). Switch 206B is open (XFER1 230C-2 remains low) during all three phases 235A-235C shown in FIG. 3B, thereby isolating column amplifier 106B from the pixel circuits 103. When switch 206A is closed, the input node of the amplifier 208A is also connected (via capacitor 204B) to the pixel output of a second pixel circuit 103 in the selected row in array 102 (i.e., the pixel circuit 103 connected to input 202B). Switch 210A is closed (SAMP 230E goes high) during the first phase 235A, which places the amplifier 208A in a unity gain configuration. Switch 214A is also closed (colRef 230D goes high) during the first phase 235A, thereby connecting one side of capacitor 212A to voltage supply 218A. During the first phase 235A, the input side of capacitor 204A is charged to the settled integrated output voltage, Vs, of the pixel circuit 103 connected to input 202A, and capacitor 212A is charged with the difference between Vcm and the amplifier 208A unity gain voltage. Also during the first phase 235A, the input side of capacitor 204B is charged to the settled integrated output voltage, of the pixel circuit 103 connected to input 202B. At the end of the first phase 235A, switches 210A and 214A both open (SAMP 230E and colRef 230D go low), preventing any further change in the charge on the shared node between capacitors 204A and 212A, and effectively capturing a first Vs on capacitor 204A, and a second Vs on capacitor 204B.

At the beginning of the second phase 235B, switch 216A is closed (SMR 230F goes high), putting capacitor 212A in the feedback loop and forcing a voltage equal to Vcm (minus a small error term due to the non-infinite gain of the inverting amplifier 208A) onto the column amplifier output 222A. During the second phase 235B, the selected pixel row is reset (by asserting Rst signal 230B), and the voltages at the column amplifier inputs 202A and 202B settle to the pixel reset level, Vr, as shown by waveforms 232A and 232B in FIG. 3B.

At the beginning of the third phase 235C, switch 206A is opened (XFER0 230C-1 goes low) and the pixel reset voltage, Vr, is captured at the column amplifier inputs 202A-202B. And the voltage at the column amplifier output 222A holds at a level represented by the following Equation III:

$$VOUT=Vcm-((C0a/C1)(Vr(n)-Vs(n))+(C0b/C1)(Vr(n+2)-Vs(n+2))+Vnoise) \quad \text{Equation III}$$

where:
VOUT is the output voltage 234A on output node 222A;
Vcm is the reference voltage supplied by voltage supply 218A;
C0$a$ is the capacitance of capacitor 204A;
C0$b$ is the capacitance of capacitor 204B;
C1 is the capacitance of capacitor 212A;
Vr(n) is the pixel reset voltage of the pixel circuit 103 connected to input 202A;
Vr(n+2) is the pixel reset voltage of the pixel circuit 103 connected to input 202B;
Vs(n) is the pixel output voltage after exposure of the pixel circuit 103 connected to input 202A;
Vs(n+2) is the pixel output voltage after exposure of the pixel circuit 103 connected to input 202B; and
Vnoise is the combined noise contribution from pixel circuits 103 connected to inputs 202A and 202B.

As shown in FIG. 3B for waveform 232A, the difference between Vr and Vs at the input 202A of the column amplifier 106A is represented by the symbol ΔV, which is 100 mV for the example waveform shown. For waveform 232B, the difference (ΔV) between Vr and Vs at the input 202B of the column amplifier 106B is 150 mV for the example waveform shown. For waveform 234A, the difference (ΔV) between Vcm and the final output voltage (represented by Equation III above) is equal to 250 mV, which is the sum of the two input ΔV's of 100 mV and 150 mV. The connection of the two adjacent even column amplifiers 106A and 106B essentially increases the pixel sensitivity while simultaneously averaging adjacent pixels of a common color. If the adjacent two even pixels output approximately the same signal levels, the sensitivity will essentially double. The noise is uncorrelated, so a root mean square (RMS) value can be used, as shown in the following Equation IV:

$$Vnoise=(Vnoise(n)^2+Vnoise(n+2)^2)^{(1/2)}=(2\ kt/c)^{(1/2)} \quad \text{Equation IV}$$

where:
Vnoise(n)=noise for the pixel circuit 103 connected to input 202A; and
Vnoise(n+2)=noise for the pixel circuit 103 connected to input 202B.

Assuming the capacitors C0$a$, C0$b$, and C1 are all equal, the signal to noise ratio (SNR) is given by the following Equation V:

$$SNR=(Vr(n)-Vs(n)+Vr(n+2)-Vs(n+2))/((2\ kt/c)^{(1/2)}) \quad \text{Equation V}$$

The resulting signal to noise ratio given by Equation V is higher than the signal to noise ratio given by Equation II by approximately the square root of two.

Although only two even column amplifiers 106A and 106B are shown in FIG. 3A to simply the illustration and explanation of one embodiment of the present invention, in one form of the invention, the remaining pairs of adjacent even column amplifiers 106 in sensor 100 would also be connected as shown in FIG. 3A, and adjacent odd column amplifiers 106 would be connected in the same manner.

Figure 4A:
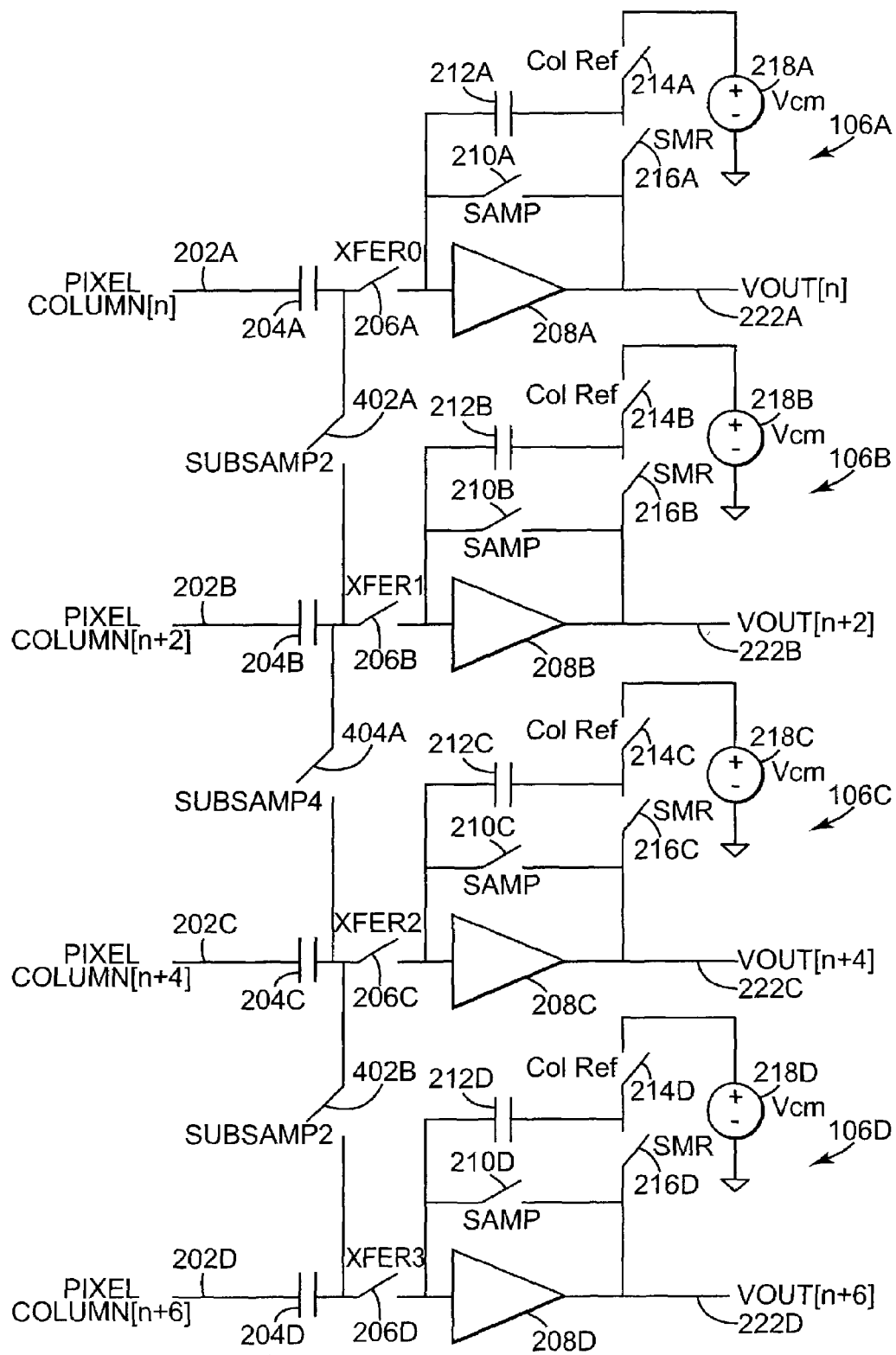
FIG. 4A is an electrical schematic diagram illustrating four even column amplifiers configured to provide increased sensitivity in four-to-one and two-to-one sub-sampling modes according to one embodiment of the present invention.

FIG. 4A is an electrical schematic diagram illustrating four even column amplifiers 106A-106D configured to provide increased sensitivity in four-to-one and two-to-one sub-sampling modes according to one embodiment of the present invention. Column amplifiers 106B-106D are configured in the same general manner as column amplifier 106A, which was described above with reference to FIGS. 2A and 2B. Common elements between column amplifier 106A and column amplifiers 106B-106D are identified with the same reference numbers, but the letters "A," "B," "C," and "D" have been appended to the reference numbers to distinguish between the elements of the four column amplifiers 106A-106D.

Column amplifiers 106A and 106B are coupled together via switch 402A. Switch 402A is connected between the node connecting capacitor 204A and switch 206A and the node connecting capacitor 204B and switch 206B. Column amplifiers 106B and 106C are coupled together via switch 404A. Switch 404A is connected between the node connecting capacitor 204B and switch 206B and the node connecting capacitor 204C and switch 206C. Column amplifiers 106C and 106D are coupled together via switch 402B. Switch 402B is connected between the node connecting capacitor 204C and switch 206C and the node connecting capacitor 204D and switch 206D. The operation of column amplifiers 106A-106D is described in further detail below with reference to FIG. 4B.

Figure 4B:
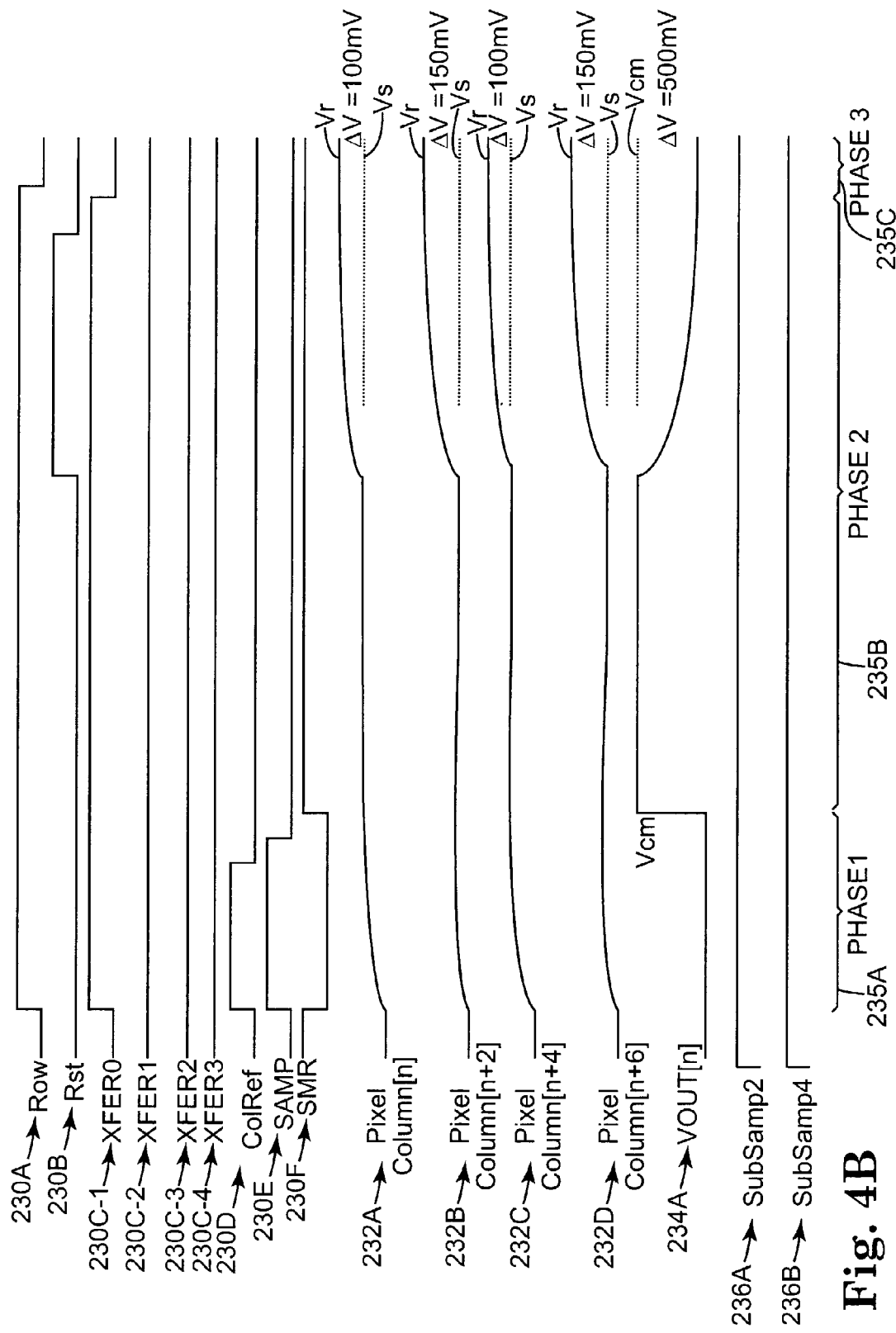
FIG. 4B is a timing diagram illustrating the timing of control signals for controlling the operation of the pixel circuits shown in FIG. 1 and the column amplifiers shown in FIG. 4A according to one embodiment of the present invention.

FIG. 4B is a timing diagram illustrating the timing of control signals 230A-230F (collectively referred to as control signals 230) for controlling the operation of the pixel circuits 103 and the column amplifiers 106A-106D according to one embodiment of the present invention. As mentioned above, row signal 230A and Reset (Rst) signal 230B are signals that are sent from controller 110 through the row decoders 104 to pixel circuits 103 to select a row of pixels 103, and reset a row of pixels 103, respectively. XFER0 signal 230C-1, XFER1 signal 230C-2, XFER2 signal 230C-3, and XFER3 signal 230C-4 (collectively identified by reference number 230C) are signals that are sent from controller 110 to column amplifiers 106A-106D to independently control the operation of switches 206A, 206B, 206C, and 206D, respectively. ColRef signal 230D, SAMP signal 230E, and SMR signal 230F, are signals that are sent from controller 110 to column amplifiers 106A-106D to control the operation of switches 214A-214D, 210A-210D, and 216A-216D, respectively. A logic high level for any of signals 230C-230F indicates that the corresponding switch is closed, and a logic low level for any of signals 230C-230F indicates that the corresponding switch is open.

FIG. 4B also illustrates example input and output waveforms of column amplifiers 106A-106D. Pixel column[n] waveform 232A represents an example voltage level over time at the pixel column input node 202A of column amplifier 106A. Pixel column[n+2] waveform 232B represents an example voltage level over time at the pixel column input node 202B of column amplifier 106B. Pixel column waveform[n+4] 232C represents an example voltage level over time at the pixel column input node 202C of column amplifier 106C. Pixel column waveform[n+6] 232D represents an example voltage level over time at the pixel column input node 202D of column amplifier 106D. VOUT[n] waveform 234A represents the voltage level over time at the output node (VOUT[n]) 222A of column amplifier 106A.

Also shown in FIG. 4B is a first sub-sample control signal (SubSamp2) 236A, which is output from controller 110 to control the operation of switches 402A and 402B. A second sub-sample control signal (SubSamp4) 236B is output from controller 110 to control the operation of switch 404A. A logic high level for signals 236A and 236B indicates that the corresponding switch or switches are closed, and a logic low level for signals 236A and 236B indicates that the corresponding switch or switches are open. In one embodiment, controller 110 sets the SubSamp2 signal 236A high and the SubSamp4 signal 236B low if a user has selected a two-to-one sub-sampling mode, and sets both signals 236A and 236B high if a user has selected a four-to-one sub-sampling mode. As shown in FIG. 4B, SubSamp2 signal 236A and SubSamp4 signal 236B are both maintained at a logic high level for all three phases 235A-235C (i.e., a four-to-one sub-sampling mode has been selected), so switches 402A, 402B, and 404A are closed during this entire period. If sub-sampling is not enabled, switches 402A, 402B, and 404A, remain open and column amplifiers 106A-106D operate independently, as described above with reference to FIGS. 2A and 2B.

As indicated in FIG. 4B, during the first phase 235A, switch 206A is closed (XFER0 230C-1 goes high), thereby connecting (via capacitor 204A) the input node of the amplifier 208A to the pixel output of a first pixel circuit 103 in a selected row in array 102 (i.e., the pixel circuit 103 connected to input 202A). Switches 206B, 206C, and 206D are open (XFER1 230C-2, XFER2 230C-3, and XFER3 230C-4 remain low) during all three phases 235A-235C shown in FIG. 4B, thereby isolating column amplifiers 106B, 106C, and 106D from the pixel circuits 103. When switch 206A is closed, the input node of the amplifier 208A is also connected to the pixel output of a second, a third, and a fourth pixel circuit 103 via capacitors 204B, 204C, and 204D (i.e., the pixel circuits 103 connected to inputs 202B, 202C, and 202D). Switch 210A is closed (SAMP 230E goes high) during the first phase 235A, which places the amplifier 208A in a unity gain configuration. Switch 214A is also closed (colRef 230D goes high) during the first phase 235A, thereby connecting one side of capacitor 212A to voltage supply 218A. During the first phase 235A, the input side of capacitor 204A is charged to the settled integrated output voltage, Vs, of the pixel circuit 103 connected to input 202A, and capacitor 212A is charged with the difference between Vcm and the amplifier 208A unity gain voltage. Also during the first phase 235A, the input side of capacitor 204B is charged to the settled integrated output voltage, Vs, of the pixel circuit 103 connected to input 202B, the input side of capacitor 204C is charged to the settled integrated output voltage, Vs, of the pixel circuit 103 connected to input 202C, and the input side of capacitor 204D is charged to the settled integrated output voltage, Vs, of the pixel circuit 103 connected to input 202D. At the end of the first phase 235A, switches 210A and 214A both open (SAMP 230E and colRef 230D go low), preventing any further change in the charge on the shared node between capacitors 204A and 212A, and effectively capturing a first Vs on capacitor 204A, a second Vs on capacitor 204B, a third Vs on capacitor 204C, and a fourth Vs on capacitor 204D.

At the beginning of the second phase 235B, switch 216A is closed (SMR 230F goes high), putting capacitor 212A in the feedback loop and forcing a voltage equal to Vcm (minus a small error term due to the non-infinite gain of the inverting amplifier 208A) onto the column amplifier output 222A. During the second phase 235B, the selected pixel row is reset (by asserting Rst signal 230B), and the voltages at the column amplifier inputs 202A-202D settle to the pixel reset level, Vr, as shown by waveforms 232A-232D in FIG. 4B.

At the beginning of the third phase 235C, switch 206A is opened (XFER0 230C-1 goes low) and the pixel reset voltage, Vr, is captured at the column amplifier inputs 202A-202D. And the voltage at the column amplifier output 222A holds at a level represented by the following Equation VI:

$$\text{VOUT} = \text{Vcm} - ((C0a/C1)(Vr(n)-Vs(n)) + (C0b/C1)(Vr(n+2)-Vs(n+2)) + (C0c/C1)(Vr(n+4)-Vs(n+4)) + (C0d/C1)(Vr(n+6)-Vs(n+6)) + \text{Vnoise})$$

Equation VI where:
VOUT is the output voltage 234A on output node 222A;
Vcm is the reference voltage supplied by voltage supply 218A;
$C0a$ is the capacitance of capacitor 204A;
$C0b$ is the capacitance of capacitor 204B;
$C0c$ is the capacitance of capacitor 204C;
$C0d$ is the capacitance of capacitor 204D;
$C1$ is the capacitance of capacitor 212A;
Vr(n) is the pixel reset voltage of the pixel circuit 103 connected to input 202A;
Vr(n+2) is the pixel reset voltage of the pixel circuit 103 connected to input 202B;
Vr(n+4) is the pixel reset voltage of the pixel circuit 103 connected to input 202C;
Vr(n+6) is the pixel reset voltage of the pixel circuit 103 connected to input 202D;
Vs(n) is the pixel output voltage after exposure of the pixel circuit 103 connected to input 202A;
Vs(n+2) is the pixel output voltage after exposure of the pixel circuit 103 connected to input 202B;
Vs(n+4) is the pixel output voltage after exposure of the pixel circuit 103 connected to input 202C;
Vs(n+6) is the pixel output voltage after exposure of the pixel circuit 103 connected to input 202D; and
Vnoise is the combined noise contribution from pixel circuits 103 connected to inputs 202A, 202B, 202C, and 202D.

As shown in FIG. 4B for waveform 232A, the difference between Vr and Vs at the input 202A of the column amplifier 106A is represented by the symbol ΔV, which is 100 mV for the example waveform shown. For waveform 232B, the difference (ΔV) between Vr and Vs at the input 202B of the column amplifier 106B is 150 mV for the example waveform shown. For waveform 232C, the difference (ΔV) between Vr and Vs at the input 202C of the column amplifier 106C is 100 mV for the example waveform shown. For waveform 232D, the difference (ΔV) between Vr and Vs at the input 202D of the column amplifier 106D is 150 mV for the example waveform shown. For waveform 234A, the difference (ΔV) between Vcm and the final output voltage (represented by Equation VI above) is equal to 500 mV, which is the sum of the four input ΔV's of 100 mV, 150 mV, 100 mV, and 150 mV. The connection of the four adjacent even column amplifiers 106A-106D essentially increases the pixel sensitivity while simultaneously averaging adjacent pixels of a common color. If the adjacent four even pixels output approximately the same signal levels, the sensitivity will essentially quadruple. The noise is uncorrelated, so a root mean square (RMS) value can be used, as shown in the following Equation VII:

$$Vnoise = (Vnoise(n)^2 + Vnoise(n+2)^2 + Vnoise(n+4)^2 + Vnoise(n+6)^2)^{(1/2)} = (4\ kt/c)^{(1/2)} \quad \text{Equation VII}$$

where:
Vnoise(n)=noise for the pixel circuit 103 connected to input 202A;
Vnoise(n+2)=noise for the pixel circuit 103 connected to input 202B;
Vnoise(n+4)=noise for the pixel circuit 103 connected to input 202C; and
Vnoise(n+6)=noise for the pixel circuit 103 connected to input 202D.

Assuming the capacitors C0a, C0b, C0c, C0d and C1 are all equal, the signal to noise ratio (SNR) is given by the following Equation VIII:

$$SNR = (Vr(n) - Vs(n) + Vr(n+2) - Vs(n+2) + Vr(n+4) - Vs(n+4) + Vr(n+6) - Vs(n+6))/(2*(kt/c)^{1/2}) \quad \text{Equation VIII}$$

The resulting signal to noise ratio given by Equation VIII is higher than the signal to noise ratio given by Equation II by approximately a factor of 2.

If a two-to-one sub-sampling mode had been selected rather than a four-to-one mode as described above, switches 402A and 402B would be closed, and switch 404A would be open. In addition, XFER2 signal 230C-3 would have the same waveform as XFER0 signal 230C-1 shown in FIG. 4B, and column amplifier pair 106A-106B, and column amplifier pair 106C-106D would both operate as described above with reference to FIGS. 3A-3B.

Although only four even column amplifiers 106A-106D are shown in FIG. 4A to simply the illustration and explanation of one embodiment of the present invention, in one form of the invention, the remaining sets of four adjacent even column amplifiers 106 in sensor 100 would also be connected as shown in FIG. 4A, and sets of four adjacent odd column amplifiers 106 would be connected in the same manner.

Figure 5:
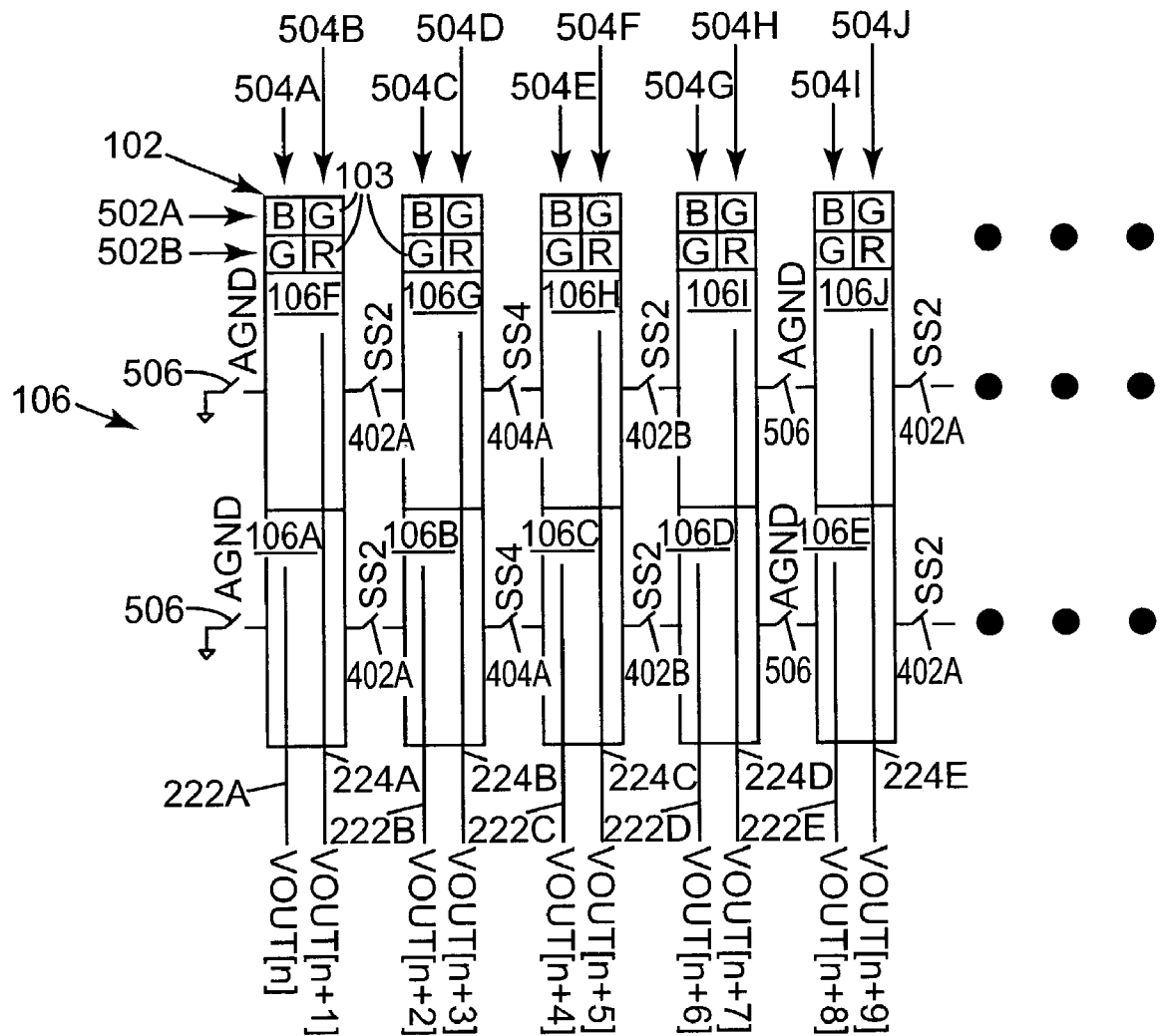
FIG. 5 is a block diagram illustrating a portion of a pixel array and an array of column amplifiers configured to provide increased sensitivity in sub-sampling modes according to one embodiment of the present invention.

FIG. 5 is a block diagram illustrating a portion of pixel array 102 and an array of column amplifiers 106 configured to provide increased sensitivity in sub-sampling modes according to one embodiment of the present invention. Pixel array 102 includes a plurality of pixels 103 organized into a plurality of rows 502A-502B (collectively referred to as rows 502) and a plurality of columns 504A-504J (collectively referred to as columns 504). Row 502A is an even column, and row 502B is an odd column. Columns 504A, 504C, 504E, 504G, and 504I, are even columns, and columns 504B, 504D, 504F, 504H, and 504J, are odd columns. Although only two rows 502 and ten columns 504 are shown in FIG. 5 to simplify the illustration, actual implementations may contain many more rows and columns.

Each pixel 103 in FIG. 5 is labeled with the letter "R," "G," or "B," indicating that the pixel is a red pixel, a green pixel, or a blue pixel, respectively. In one embodiment, pixels 103 in an even row and an even column are blue pixels, pixels 103 in an even row and an odd column are green pixels, pixels 103 in an odd row and an even column are green pixels, and pixels 103 in an odd row and an odd column are red pixels.

The array of column amplifiers 106 includes a plurality of even column amplifiers 106A-106E, and a plurality of odd column amplifiers 106F-106J. Each even column amplifier 106A-106E is configured to be coupled to a pixel 103 in an even column 504, and each odd column amplifier 106F-106J is configured to be coupled to a pixel 103 in an odd column 504. The outputs of the even column amplifiers 106A-106E are output 222A (VOUT[n]), output 222B (VOUT[n+2]), output 222C (VOUT[n+4]), output 222D (VOUT[n+6]), and output 222E (VOUT[n+8]), respectively. The outputs of the odd column amplifiers 106F-106J are output 224A (VOUT[n+1]), output 224B (VOUT[n+3]), output 224C (VOUT[n+5]), output 224D (VOUT[n+7]), and output 224E (VOUT[n+9]), respectively. In one embodiment, each column amplifier 106 shown in FIG. 5 is configured as shown in FIG. 2A.

In one form of the invention, even column amplifiers 106A-106D are connected together via switches 402A, 404A, and 402B, as shown in FIG. 4A, and each subsequent set of four even column amplifiers 106 are connected together in the same manner with switches 402A, 404A, and 402B. Similarly, odd column amplifiers 106F-106I are connected together via switches 402A, 404A, and 402B, as shown in FIG. 4A, and each subsequent set of four odd column amplifiers are connected together in the same manner with switches 402A, 404A, and 402B. In one embodiment, switches 506, which are connected to analog ground (AGND), are provided between each set of four even and odd column amplifiers 106. In one embodiment, switches 506 are tied to an off position for all modes of operation, and are used to match the parasitic capacitance at the input to amplifiers 208 (shown in FIG. 4A). Without switches 506, a coherent fixed pattern noise would result in the image produced by the sensor 100. In one embodiment, switches 402A, 404A, 402B, and 506, are implemented with MOSFET transistors.

Switches 402A and 402B are controlled by sub-sample control signal (SubSamp2 or SS2) 236A (shown in FIG. 4B), which is output from controller 110. Switches 404A are controlled by sub-sample control signal (SubSamp4 or SS4) 236B, which is output from controller 110. A logic high level for signals 236A and 236B indicates that the corresponding switches are closed, and a logic low level for signals 236A and 236B indicates that the corresponding switch or switches are open. In one embodiment, controller 110 sets the SS2 signal 236A high and the SS4 signal 236B low if a user has selected a two-to-one sub-sampling mode, and sets both signals 236A and 236B high if a user has selected a four-to-one sub-sampling mode.

Thus, in a two-to-one sub-sampling mode, sets of two even column amplifiers 106 are connected together, and sets of two odd column amplifiers 106 are connected together, via switches 402A and 402B. For the embodiment shown in FIG. 5, even column amplifiers 106A and 106B would be connected to each other, even column amplifiers 106C and 106D would be connected to each other, odd column amplifiers 106F and 106G would be connected to each other, and odd column amplifiers 106H and 106I would be connected to each other. Similar connections of pairs of two adjacent even and odd column amplifiers would be made throughout the array of column amplifiers 106. For each pair of connected column amplifiers 106, the outputs of the two pixel circuits 103 connected to the two column amplifiers 106 are combined by one of the two column amplifiers 106, and a single enhanced output is provided for each pair of connected column amplifiers 106. The connection of adjacent pairs of column amplifiers 106 in this manner essentially doubles the sensitivity of pixels 103 in a two-to-one sub-sampling mode.

In a four-to-one sub-sampling mode, sets of four even column amplifiers 106 are connected together, and sets of four odd column amplifiers 106 are connected together, via switches 402A, 402B, and 404A. For the embodiment shown in FIG. 5, even column amplifiers 106A-106D would be connected to each other, and odd column amplifiers 106F-106I would be connected to each other. Similar connections of sets of four adjacent even and odd column amplifiers would be made throughout the array of column amplifiers 106. For each set of four connected column amplifiers 106, the outputs of the four pixel circuits 103 connected to the four column amplifiers 106 are combined by one of the four column amplifiers 106, and a single enhanced output is provided for each set of four connected column amplifiers 106. The connection of adjacent sets of four column amplifiers 106 in this manner essentially quadruples the sensitivity of pixels 103 in a four-to-one sub-sampling mode.

Although embodiments of the present invention have been described in the context of two-to-one and four-to-one sub-sampling modes, the techniques described herein may also be applied to other sub-sampling modes, as will be understood by persons of ordinary skill in the art.

One embodiment of the present invention essentially doubles the sensitivity of pixels in an APS image sensor in two-to-one sub-sampling modes, quadruples the sensitivity in four-to-one sub-sampling modes, provides averaging of adjacent pixels of a common color, and provides an increased signal to noise ratio in sub-sampling modes. The averaging of adjacent pixels of a common color provides smoother image results. In one embodiment, skipped pixel information in sub-sampling modes is used to provide improved spatial sampling, rather than being discarded as is done in prior art sensors.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of sampling image signals generated by multi-transistor pixel circuits of an active pixel sensor (APS) image sensor, the APS image sensor supporting a normal mode of operation and a sub-sampling mode of operation, the method comprising:

providing a plurality of column amplifiers separate and distinct from the multi-transistor pixel circuits and coupled to output nodes of the multi-transistor pixel circuits, each column amplifier including an input configured to be coupled to a column of multi-transistor pixel circuits, an input capacitor coupled to the input of the column amplifier, an amplifier circuit, a first switch coupled between the input capacitor and the amplifier circuit, and a first node connected in series with the input capacitor and the first switch and positioned between the input capacitor and the first switch such that the input capacitor is positioned between the input and the first node;

providing a plurality of second switches connected to the column amplifiers, each second switch being coupled between the first nodes of two of the column amplifiers;

selecting a row of multi-transistor pixels circuits to sample;

routing image signals from the output node of each multi-transistor pixel circuit in the selected row to a different one of the plurality of column amplifiers by opening the second switches when the APS image sensor is in the normal mode of operation; and routing image signals from the output nodes of a plurality of the multi-transistor pixel circuits in the selected row to a common one of the plurality of column amplifiers by closing at least some of the second switches when the APS image sensor is in the sub-sampling mode of operation, including exclusively routing multiple image signals from the output nodes of odd column multi-transistor pixel circuits to a common odd column amplifier of the column amplifiers and exclusively routing multiple image signals from the output nodes of even column multi-transistor pixel circuits to a common even column amplifier of the column amplifiers.

2. The method of claim 1, wherein the APS image sensor supports multiple sub-sampling modes of operation, the method further comprising:

receiving sub-sample selection information identifying a desired sub-sampling mode of operation, wherein only a subset of the image signals generated by the pixel circuits is sampled in the identified sub-sampling mode.

3. The method of claim 2, wherein the number of pixel circuits in the plurality of pixel circuits in the selected row is determined based on the sub-sample selection information.

4. The method of claim 1, wherein the plurality of pixel circuits in the selected row includes two pixel circuits when the sub-sampling mode of operation is a two-to-one sub-sampling mode.

5. The method of claim 1, wherein the plurality of pixel circuits in the selected row includes four pixel circuits when the sub-sampling mode of operation is a four-to-one sub-sampling mode.

6. The method of claim 1, and further comprising:

providing a plurality of switches positioned between the output nodes of the pixel circuits and the plurality of column amplifiers for selectively routing image signals from the output node of each pixel circuit to different ones of the plurality of column amplifiers; and configuring the plurality of switches based on a current mode of operation of the image sensor.

7. An active pixel sensor (APS) image sensor comprising:

an array of multi-transistor pixel circuits;

a plurality of amplifiers for buffering image signals output by the array of multi-transistor pixel circuits, each amplifier including an input configured to be coupled to a column of multi-transistor pixel circuits, an input capacitor coupled to the input of the amplifier, an amplifier circuit, a first switch coupled between the input capacitor and the amplifier circuit, and a first node connected in series with the input capacitor and the first switch and positioned between the input capacitor and the first switch such that the input capacitor is positioned between the input and the first node;

a routing mechanism separate from the array of multi-transistor pixel circuits and positioned between the array of multi-transistor pixel circuits and the plurality of amplifiers, the routing mechanism being connected to the nodes of the amplifiers; and a controller for selecting a subset of the multi-transistor pixel circuits for sampling, the controller configured to control the routing mechanism to connect each multi-transistor pixel circuit in the subset to a different one of the amplifiers during a normal mode of operation, the controller also being configured to exclusively connect multiple odd column multi-transistor pixel circuits in the subset to a common odd column amplifier of the amplifiers and exclusively connected multiple even column multi-transistor pixel circuits in the subset to a common even column amplifier of the amplifiers during a sub-sampling mode of operation.

8. The image sensor of claim 7, wherein the routing mechanism comprises a plurality of switches.

9. The image sensor of claim 8, wherein the plurality of switches are MOSFET transistors.

10. The image sensor of claim 7, wherein the selected subset of pixel circuits is a row of pixel circuits.

11. The image sensor of claim 7, wherein the image sensor supports multiple sub-sampling modes of operation, and wherein the controller is configured to receive sub-sample selection information identifying a desired sub-sampling mode of operation.

12. The image sensor of claim 11, wherein the number of pixel circuits in the multiple pixel circuits in the subset is determined based on the sub-sample selection information.

13. The image sensor of claim 7, wherein the sub-sampling mode of operation is a two-to-one sub-sampling mode, and wherein the multiple pixel circuits in the subset include two pixel circuits.

14. The image sensor of claim 7, wherein the sub-sampling mode of operation is a four-to-one sub-sampling mode, and wherein the multiple pixel circuits in the subset include four pixel circuits.

15. A column amplifier array for a CMOS image sensor, the column amplifier array comprising:

a plurality of column amplifiers that are separate and distinct from pixel circuits of the image sensor, each column amplifier including an input configured to be coupled to a column of pixel circuit in the image sensor, an input capacitor coupled to the input of the column amplifier, an amplifier circuit, a first switch coupled between the input capacitor and the amplifier circuit, and a first node connected in series with the input capacitor and the first switch and positioned between the input capacitor and the first switch such that the input capacitor is positioned between the input and the first node; and a second switch coupled between the first nodes of two of the column amplifiers, the second switch configured to be open during a normal mode of operation of the image sensor and configured to be closed during a sub-sample mode of operation of the image sensor.

16. The column amplifier array of claim 15, wherein the column amplifier array includes a plurality of even column amplifiers configured to be coupled to even columns of pixel circuits in the image sensor, and a plurality of odd column amplifiers configured to be coupled to odd columns of pixel circuits in the image sensor.

17. The column amplifier array of claim 16, wherein the second switch is directly connected to the first nodes of two of the even column amplifiers, the column amplifier array further comprising a third switch directly connected to the first nodes of two of the odd column amplifiers.

18. The column amplifier array of claim 16, wherein the first nodes of each of the odd column amplifiers are exclusively connected together with a first plurality of switches, and the first nodes of each of the odd column amplifiers are exclusively connected together with a second plurality of switches.

19. The column amplifier array of claim 18, wherein the first and the second plurality of switches are configured to be opened and closed based on a current mode of operation of the image sensor.

20. The column amplifier array of claim 15, wherein the second switch is a MOSFET transistor.

* * * * *